US008637082B2

(12) United States Patent
Tulsky et al.

(10) Patent No.: US 8,637,082 B2
(45) Date of Patent: Jan. 28, 2014

(54) METHODS FOR PREPARATION OF ZNTE NANOCRYSTALS

(75) Inventors: Eric Tulsky, Berkeley, CA (US); Joseph Bartel, Eugene, OR (US); Joseph Treadway, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 13/119,170

(22) PCT Filed: Oct. 2, 2009

(86) PCT No.: PCT/US2009/059346
§ 371 (c)(1),
(2), (4) Date: Aug. 29, 2011

(87) PCT Pub. No.: WO2010/040032
PCT Pub. Date: Apr. 8, 2010

(65) Prior Publication Data
US 2011/0300076 A1    Dec. 8, 2011

Related U.S. Application Data

(60) Provisional application No. 61/102,599, filed on Oct. 3, 2008.

(51) Int. Cl.
*A61K 9/14*    (2006.01)

(52) U.S. Cl.
USPC ....................................................... 424/489

(58) Field of Classification Search
None
See application file for complete search history.

(56) References Cited

U.S. PATENT DOCUMENTS

| 5,262,357 A | 11/1993 | Alivisatos et al. |
|---|---|---|
| 5,505,928 A | 4/1996 | Alivisatos et al. |
| 5,690,807 A | 11/1997 | Clark, Jr. et al. |
| 5,990,479 A | 11/1999 | Weiss et al. |
| 6,048,616 A | 4/2000 | Gallagher et al. |
| 6,423,551 B1 | 7/2002 | Weiss et al. |
| 6,649,138 B2 | 11/2003 | Adams et al. |
| 6,955,855 B2 | 10/2005 | Naasani |
| 7,108,915 B2 | 9/2006 | Adams et al. |
| 7,181,266 B2 | 2/2007 | Frangioni et al. |
| 7,198,847 B2 | 4/2007 | Naasani |
| 7,767,260 B2 | 8/2010 | Peng et al. |
| 2010/0029961 A1* | 2/2010 | Triller et al. ................. 549/539 |

FOREIGN PATENT DOCUMENTS

WO    WO 99/26299    5/1999

OTHER PUBLICATIONS

Navarro, Investigating uptake of water-dispersible CdSe/ZnS quantum dot nanoparticles by Arabidopsis thaliana plants , Journal of Hazardous Materials, 2012, 211-221, 427-435.*
Dabbousi et al., J. Phys. Chem. B 101(46):9463-9475 (1997).
Guan, J, Submitted for the Degree of Master of Science in Chemistry, Massachusetts Institute of Technology, pp. 16, 23-27, 31, 38 and 54 (2008).
Hines et al., J. Phys. Chem. 100(2):468-471 (1996).
Kuno et al., J. Phys. Chem. 106(23):9869-9882 (1997).
Peng et al., J. Am. Chem. Soc. 119(30):7019-7029 (1997).
Stankova et al., J. Peptide Sci. 5:392-398 (1999).
Molecular Probes, Inc., "Qdot® ITK™ Carboxyl Quantum Dots Product Sheet", 2007, pp. 1-11.

* cited by examiner

*Primary Examiner* — Paul Dickinson
(74) *Attorney, Agent, or Firm* — Life Technologies Corporation (57) ABSTRACT

Nanocrystals having a ZnTe core and methods for making and using them to construct core-shell nanocrystals are described. These core-shell nanocrystals are highly stable and provide quantum yields and stability suitable for applications such as flow cytometry, cellular imaging, and protein blotting, medical imaging, and other applications where cadmium toxicity is an issue.

22 Claims, 4 Drawing Sheets

METHODS FOR PREPARATION OF ZNTE NANOCRYSTALS

CROSS REFERENCE TO RELATED APPLICATION

This application is a national stage filing of International Application No. PCT/2009/059346, filed Oct. 2, 2009, which claims priority to U.S. Provisional Application No. 61/102,599, filed Oct. 3, 2008; which disclosures are incorporated herein by reference in their entirety.

STATEMENT REGARDING FEDERALLY SPONSORED RESEARCH FUNDING

This invention was made, in part, with government support under cooperative agreement No. 70NANB4H3053 with the National Institute of Standards and Technology and the U.S. Department of Commerce. The government may have certain rights in this invention.

FIELD OF THE INVENTION

Provided herein are semiconductor nanocrystal compositions containing zinc telluride and methods of making and using such compositions.

BACKGROUND ART

Semiconductor nanocrystals have a wide variety of applications. Of the many unique properties of these materials, the photophysical characteristics may be the most useful. Specifically, these materials can absorb light and then emit an intense luminescent emission that is particle size-dependent and particle composition-dependent. This fluorescent emission can have an extremely narrow luminescence bandwidth, can be environmentally sensitive or insensitive depending on the nanocrystal's structure, and can be resistant to photobleaching under intensive light sources. Emissions can be efficiently excited with electromagnetic radiation having a shorter wavelength than the highest energy emitter in the material, and by varying the size and composition of the nanocrystal, a user can use many different types of nanoparticles mixed together and can still distinguish each type. These properties allow semiconductor nanocrystals to be used as markers or as ultra-sensitive luminescent reporters of biological states and processes in highly multiplexed systems.

Nanocrystals are typically spherical or nearly so (though methods of making nanocrystals of other shapes are known), and can have multiple layers, such as a central core, a surrounding shell, and optional capping groups, linkers, and other surface-conjugated materials. Typically, core/shell nanocrystals are described according to the composition of the core and of a semiconductor shell applied outside the core; the shell usually stabilizes the nanocrystal and protects its photophysical properties. It may also provide an attachment surface for linking the nanocrystal to a molecule, cell, subcellular organelle, and the like that is to be tracked or observed.

The nanocrystal core largely determines its critical light absorption and emission characteristics. Nanocrystal cores have been broadly studied and improvements in synthesis have led to the optimization of key physiochemical properties resulting in nanocrystal cores with uniform size distributions and intense, narrow emission bands following photo-excitation. However, nanocrystal cores alone lack sufficiently intense or stable emission intensities for most applications, and nanocrystal cores are particularly sensitive to their environment; for example, the aqueous environment required for many biological applications can lead to the complete destruction of the luminescence of nanocrystal cores. Thus, methods to photostabilize nanocrystal cores (e.g., protect their luminescent properties) and make them stable and useful in aqueous media are of great interest for biological applications. Commonly, this is achieved by applying a shell over the core, to form a so-called core/shell nanocrystal.

The choice of shell material must be made to match the core material. For example, the shell material may have a wider band gap than the core, which enables it to protect the activated state that the core occupies when it has been photoactivated, forming a separated electron and hole. The shell may ideally be chosen to have an atomic spacing and lattice structure that closely match those of the core material to best preserve the photophysical attributes of the core, since irregularities in the interface between core and shell may be responsible for non-radiative energy dissipation mechanisms that reduce luminescent efficiency.

Core/shell nanocrystals having a CdX core wherein X is S, Se, or Te coated with a YZ shell where Y is Cd or Zn, and Z is S, Se, or Te are commonly discussed and used, and have been shown to have good emission characteristics and stability. This may largely be due to the YZ coating material's bandgap energy which spans that of the core relatively symmetrically. 'Symmetry' as used in this sense means that the wider bandgap of the shell material fully encompasses the narrower bandgap of the core material and extends both above the high end of the core material's bandgap and below the low end of the core material's bandgap.

One limitation of CdSe-based core/shell nanocrystals is that the blue emitting particles have lower extinction coefficients than red emitting particles. This is due to the fact that emission wavelength are tuned by changing the CdSe core particle size: smaller particles have a blue-shifted emission, but also typically absorb light less efficiently than larger, red-shifted particles. Several researchers have shown that by utilizing alloy cores (e.g., CdSSe or ZnCdSe) one can tune the wavelength by adjusting the elemental composition rather than size, and can thus decouple emission color from extinction coefficient. One can also utilize a semiconductor material with a larger bulk band gap such that the largest nanocrystals emit in the blue/green portion of the visible spectrum (e.g., ZnSe).

A more serious limitation of CdSe nanocrystals for certain applications such as in vivo imaging or diagnostic tests is toxicity. Cadium is a toxic metal. The toxicity of cadmium, and to a lesser extent selenium, raises concerns about using a nanocrystal containing cadmium and selenium for in vivo applications in live organisms or in living cells. Therefore, bright and stable nanocrystals that do not contain cadmium are of special value for such uses, and for any uses involving large scale production or use of nanocrystals, in order to minimize environmental impact and associated health concerns.

Accordingly, for certain applications it is advantageous to use different core materials that do not have attendant toxicity concerns. Additionally, for some applications, very small or very large nanocrystals (relatively speaking) may be advantageous; for example, if used to label a biomolecule like DNA or a protein, it may be preferable to have a very small nanocrystal, less than about 10 nm in overall size, including the core/shell nanocrystal and a coating used on the shell to adapt the particle for use in a suitable medium. For biomolecules, the most relevant medium is frequently water; thus the nanocrystals must often be specially treated and/or coated so they are readily suspended or dissolved in water. For other applications, such as tracking a large cell such as a bacterium, flow cytometry, cellular imaging, protein blotting, and other protein detection methods, it may be advantageous to use a single, very bright nanoparticle, which may sometimes be a larger particle.

BRIEF SUMMARY OF THE INVENTION

Provided herein are nanoparticles that are particularly useful in certain in vivo applications where toxicity concerns are paramount, and in applications where visualizing a labeled molecule is important. More particularly, provided herein are nanocrystals that are small, bright, stable and versatile, as well as convenient methods for making such nanocrystals. The nanoparticles can be larger than typical CdSe core nanocrystals having similar emission wavelengths, which is achieved by using a different core material.

The methods provided herein are particularly applicable to preparation of ZnTe core nanocrystals having a ZnSe shell, and optionally certain additional features. The compositions and related methods solve numerous unexpected difficulties caused by the properties of the ZnTe core.

In one aspect, provided herein are nanocrystals having a core that comprises, or consists essentially of, a semiconductor material containing zinc and tellurium (ZnTe). In some embodiments, the core is made from zinc and tellurium precursors (zinc salts, for example, and Te salts or tellurium dissolved in a trialkylphosphine to form a phosphine telluride) under conditions selected to minimize or prevent incorporation of other elements into the core. Use of ZnTe as the material for the core can provide nanocrystals that are larger than CdSe cores emitting at the same wavelength and are free of concerns about cadmium toxicity. Moreover, the nanocrystals provided herein are bright and are photostable enough for many applications where quantum dots have been used.

The ZnTe nanocrystals provided herein can be particularly useful in certain applications, such as flow cytometry, cellular imaging, and protein blotting. In particular, these nanocrystals are particularly useful in certain in vivo applications where toxicity concerns are paramount, e.g., in ophthalmology and live cell imaging and in certain applications where visualizing a labeled molecule is important. In addition, the nanocrystals provided herein are useful in application where environmental disposal is particularly problematic, such as lighting and display technology, and in other high volume consumer electronics.

ZnTe has been suggested as a suitable material for some nanocrystals; however, few reports of ZnTe nanocrystal cores have achieved the high quantum yield (>20%) needed for most practical applications, and few have provided a core/shell nanocrystal having a ZnTe core with a protective semiconductor shell. In particular, there are few reports of stable, bright (high quantum yield plus good light absorption) ZnTe core nanocrystals that are stable and usable in an aqueous environment. The nanocrystal cores as well as methods for stabilizing these cores with a passivating shell to form a core/shell nanocrystal are provided herein. In some embodiments, the core/shell nanocrystal has a core of ZnTe and a shell of ZnSe, and needs no interface layer between the core and shell to achieve the desired properties. The ZnSe shell is thus applied directly onto and in contact with the ZnTe core.

Advantageously, the nanocrystals described herein have a quantum yield of at least about 10%, sometimes at least 20%, sometimes at least 30%, sometimes at least 40%, and sometimes at least 50% or greater. The quantum yield can change over time, and in some embodiments it does not decrease by more than 50% after three weeks in organic solution. Preferably, it does not decrease by more than about 35% over three weeks, and in some embodiments the quantum yield decreases by less than 25% over a period of three weeks in solution.

Certain compositions provided herein include fluorescent semiconductor nanocrystals having a ZnTe core and a ZnSe shell. Nanocrystals prepared by the methods disclosed herein have been shown to be chemically and electrically stable in organic medium and provide cadmium-free core/shell nanocrystals with fluorescence emissions in the green to orange-red part of the visible spectrum, from about 420 nm to about 670 nm, sometimes from about 525 nm to about 560 nm. In certain embodiments, nanocrystals with ZnTe core are provided exhibiting fluorescence emission in the green region of the spectrum (e.g., about 510-550 nm).

In one example, ZnTe/ZnSe nanocrystals disclosed herein provided a quantum yield of at least about 20%, along with good photochemical and chemical stability. Nanocrystals provided herein can have fluorescence maxima in the visible wavelength range, typically between about 420 nm and about 670 nm, sometimes between about 525 nm and about 560 nm. Sometimes, the fluorescence maxima is greater than or equal to 500 nm, greater than or equal to 525 nm, greater than or equal to 550 nm, greater than or equal to 575 nm, or greater than or equal to 600 nm.

In one aspect, a semiconductor nanocrystal is provided, comprising a semiconductor core comprising zinc and tellurium (ZnTe) and a shell comprising zinc and selenium (ZnSe). In certain embodiments, the semiconductor nanocrystal can have a quantum yield of at least 20%. The semiconductor nanocrystal can be a member of a substantially monodisperse population. Any of the core/shell nanocrystals provided herein can be less than about 10 nm in diameter. In some cases, the core is less than 6 nm in diameter. The semiconductor nanocrystal can have a fluorescence emission wavelength in the range from about 420 nm to about 670 nm In some cases, the nanocrystal has a fluorescence emission wavelength in the range from about 525 nm to about 560 nm. The semiconductor nanocrystal can further comprise a coating of organic ligands. Alternatively, the nanocrystal is provided with a coating that makes the nanocrystal water dispersible. In certain embodiments, the semiconductor nanocrystal further comprises an additional shell (e.g., a shell of ZnS applied over the ZnSe shell). In certain embodiments, the semiconductor core that consists essentially of zinc and tellurium. In certain embodiments, the shell consists essentially of zinc and selenium.

In yet another aspect, a semiconductor nanocrystal is provided comprising a ZnTe core, and a shell comprising MgX or BeX, wherein X represents O, S or Se and can further include an additional shell of MgX or BeX, wherein X represents O, S or Se.

In yet another aspect, a core/shell nanocrystal is provided comprising a core of ZnTe and a shell of ZnSe or ZnSe/ZnS, further comprising a coating of phosphonic acid ligands.

In another aspect, a composition is provided, comprising a ZnTe/ZnSe core/shell semiconductor nanocrystal, wherein the composition is non-toxic to cells or tissue. The composition is photochemically and chemically stable. Such compositions can include a plurality of semiconductor nanocrystals. In certain embodiments, the composition includes a substantially monodisperse particle population of ZnTe/ZnSe nanocrystals. The nanocrystals in the composition can be water-dispersible and can have a quantum yield of 20% or greater. In some case, the quantum yield is 40% or greater. In certain embodiments, the composition further comprises an organic solvent, water, polymer, or glass. For example, compositions are provided in which the semiconductor nanocrystals are embedded in or applied to the surface of a solid or semi-solid matrix (e.g., polymer matrix, bead, or resin). Alternatively, the composition can be in the form of a liquid, gel, paste, cream, patch, film, or a powder (e.g., lyophilized powder). In certain embodiments, compositions are provided that include one or more semiconductor nanocrystals that emit light in a wavelength range that is substantially non-absorbent to animal fluid, cells, or tissue. In certain embodiments, the composition is adapted for inserting into a mammalian body, while in other cases the composition is adapted or formulated for use in an in vitro biological assay or an in vivo assay.

In yet another aspect, a pharmaceutical composition is provided, comprising a semiconductor nanocrystal as described herein (e.g., ZnTe/ZnSe). The composition can be formulated for administration to a patient. For example, the composition can be for ophthalmic administration (e.g., as an ophthalmic solution) or for topical administration (e.g., as an ophthalmic solution, skin cream, or surgical paste). The pharmaceutical composition can further include a pharmaceutically acceptable carrier for the nanocrystals (e.g., water, a saline solution, or a buffer).

In yet another aspect, kits containing ZnTe nanocrystals are provided. The kits can be for pharmaceutical uses or for use in a biological assay. An exemplary kit for pharmaceutical use includes a) one or more pharmaceutically acceptable containers; b) a pharmaceutical composition as provided herein; and c) instructions for use. Kits for biological assay can include, in addition to the nanocrystals, other reagents, such as solvents, standards, buffers, dyes, and the like.

In yet another aspect, a water-stable semiconductor nanocrystal composition is provided, comprising: at least one semiconductor ZnTe/ZnSe nanocrystal as described herein; wherein the at least one nanocrystal further comprises a water-stabilizing layer. The water-stabilizing layer can include a hydrophobic portion for interacting with the surface of the semiconductor nanocrystal and a hydrophilic portion for interacting with an aqueous medium.

In yet another aspect, provided herein are methods to make ZnTe nanocrystal cores, and methods to add a shell such as ZnSe to these cores. It has been found that ZnTe cores are unexpectedly sensitive to certain types of reaction conditions often used for making and shell-coating fluorescent nanocrystals. Consequently, good quality nanocrystals having ZnTe cores are not readily made by simply modifying the typical reaction conditions used to make other types of nanocrystals, e.g., CdSe cores. Similarly, their chemical reactivity leads to poor results when typical shell-forming reaction conditions are used. Provided herein are methods to make ZnTe crystalline and colloidally stable cores and to add a protective shell coating to produce useful fluorescent nanocrystals with high quantum yields.

In yet another aspect, a method to make a ZnTe semiconductor nanocrystal is provided, comprising contacting a $Zn^{2+}$ salt with a $Te^0$ precursor at a temperature that is sufficiently high to induce nanocrystal formation. The method can further include contacting the $Zn^{2+}$ and $Te^0$ precursor in a solvent (e.g., an amine, a phosphine, or an alkyl carboxylic acid). The amine can be a secondary or tertiary amine. In some embodiments, the amine is an alkyl amine comprising 4-24 carbon atoms. In some embodiments, the alkyl amine is a dialkylamine or a trialkylamine. In some embodiments, the amine comprises 10 or more carbon atoms. The $Zn^{2+}$ salt can include an alkyl carboxylate anion. For example, the alkyl group can include 4-24 carbon atoms. The $Zn^{2+}$ salt can include at least one unsaturated group (e.g., oleate). The $Te^0$ precursor can be $Te^0$ or $R_3PTe$. The temperature is typically above 200° C. The method can further include adding an amount of a strong reducing agent (e.g., lithium triethylborohydride) to the solvent to initiate nanocrystal formation. The amount of the strong reducing agent can be less than 1 equivalent of the $Zn^{2+}$ or less than 2 equivalents of the $Zn^{2+}$. In some embodiments, the method involves further adding a weak reductant to promote nanocrystal growth. The amount of weak reducing agent can be in excess of the number of equivalents of the $Zn^{2+}$. The method can further involve adding an amount of a $Te^{2-}$ precursor to the solvent to initiate nanocrystal formation, wherein the amount of the $Te^{2-}$ precursor is less than 1 equivalents of the $Zn^{2+}$. In certain embodiments, the method further comprises doping the ZnTe core with Se. For example, the core of the nanocrystal comprises an alloy of Zn, Te, and Se.

In yet another aspect, a method to form a ZnSe shell on a ZnTe nanocrystal core is provided, comprising contacting a ZnTe core with a $Zn^{2+}$ salt and a $Se^0$ precursor, at a temperature sufficiently high to induce shell formation. The $Se^0$ precursor (e.g., $R_3PSe$ or $Se^o$) and/or $Zn^{2+}$ salt can, optionally, be provided in a solvent. The solvent can comprise a secondary or tertiary amine, and in certain embodiments, the solvent does not include a primary amine. In some cases, the $Se^0$ precursor can be added after the $Zn^{2+}$ salt. In certain embodiments, the ZnTe nanocrystal core is heated in the solvent with a $Zn^{2+}$ salt before the $Se^0$ precursor is added. The $Zn^{2+}$ salt can be the same or different than that used to form the core and can include, e.g., an alkyl carboxylate anion. The alkyl anion can comprise 4-24 carbon atoms. In some cases, the alkyl group comprises at least one unsaturated group. The $Zn^{2+}$ salt can be, for example, $ZnCl_2$, $ZnCl(O_2CR)$ or $Zn(O_2CR)_2$, wherein R is an alkyl group. The alkyl group can include at least one unsaturated group. In some embodiments, the $Zn^{2+}$ salt comprises an oleate. The shelling method can further comprise applying an outer shell of ZnS over the ZnTe/ZnSe core/shell nanocrystal.

Methods of modifying the nanocrystals made by these methods, to make them water-soluble and/or to adapt them to link to a target molecule or an affinity molecule, and use in certain in vivo applications are also provided by the disclosure, as are methods of using these nanocrystals.

In one aspect, a method of detecting a target in a biological sample is provided. The method includes contacting a biological sample with a semiconductor nanocrystal, as provided herein, or a composition including such nanocrystals, wherein the nanocrystal or composition is non-toxic to cells or tissues; and detecting the spectral (e.g., fluorescence) emission of the semiconductor nanocrystal.

In another aspect, a method of detecting an interaction between a compound and a biological target is provided. The method comprises providing a non-toxic composition capable of a characteristic spectral emission, the composition comprises a compound and a semiconductor nanocrystal, as provided herein, associated with the compound, wherein the composition is non-toxic to cells or tissues, and wherein the emission provides information about a biological state or event; allowing a sample comprising a biological target to interact with the composition; and detecting interaction between the compound and the biological target by monitoring the spectral emission of the sample. The method can be used in various assays. For example, the spectral emission can be associated with assays selected from the group consisting of immunochemistry, immunocytochemistry, immunobiology, or immunofluorescence assays; DNA sequence analyses; fluorescence resonance energy transfer, flow cytometry, or fluorescence activated cell sorting assays; diagnostics in biological systems; in vivo imaging; and high-throughput screening. The target can be any type of cell and can be a dead, fixed, or live cell (e.g., a mammalian cell, a stem cell, a cancer cell, or the like).

In yet another aspect, a method of imaging a tissue is provided. The method includes contacting a tissue with a semiconductor nanocrystal, as provided herein, or a composition including such nanocrystals, wherein the nanocrystal or composition is non-toxic to cells or tissues; and detecting the fluorescence emission of the semiconductor nanocrystal. The method can be used to image tissue in vivo (e.g., tumor tissue or retinal tissue).

In yet another aspect, a method of marking tissue during a surgical procedure is provided. The method include contacting a tissue with a semiconductor nanocrystal, as provided herein, or a composition including such a nanocrystal, wherein the nanocrystal or composition is non-toxic to cells or tissues; and detecting the fluorescence emission of the semiconductor nanocrystal. In certain embodiments, the method can be used to mark tumor tissue (e.g., as part of a tumor resection surgery).

In yet another aspect, an electronic or photovoltaic device is provided that includes a population of semiconductor nanocrystals, as provided herein. Exemplary devices include electronic displays, light emitting diodes, solar panels, and sensors.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

While compositions and methods are described in terms of "comprising" various components or steps (interpreted as meaning "including, but not limited to"), the compositions and methods can also "consist essentially of" or "consist of" the various components and steps, unless otherwise clearly indicated herein. Such terminology should be interpreted as defining essentially closed-member groups.

Unless defined otherwise, all technical and scientific terms used herein have the same meaning as is commonly understood by one of ordinary skill in the art to which this invention belongs.

As used herein, "a" or "an" means "at least one" or "one or more."

As used herein, 'about' means that the numerical value is approximate and small variations would not significantly affect the practice of the invention. Where a numerical limitation is used, unless indicated otherwise by the context, 'about' means the numerical value can vary by ±10% and remain within the scope of the invention.

"Alkyl" as used in reference to alkyl phosphine, alkyl phosphine oxide, alkylcarboxylate or alkylamine refers to a hydrocarbon group having 1 to 24 carbon atoms, frequently between 4 and 24 carbon atoms, or between 6 and 12 carbon atoms, or between 5 and 20 carbon atoms, and which can be composed of straight chains, cyclics, branched chains, or mixtures of these. The alkyl phosphine, alkyl phosphine oxide, or alkylamine include embodiments having from one to three alkyl groups on each phosphorus or nitrogen atom. In preferred embodiments, the alkyl phosphine or alkyl phosphine oxide has three alkyl groups on P, and the alkyl amine(s) have one alkyl group on N. In some embodiments, the alkyl group contains an oxygen atom in place of one carbon of a $C_4$-$C_{24}$ or a $C_6$-$C_{12}$ alkyl group, provided the oxygen atom is not attached to P or N of the alkyl phosphine, alkyl phosphine oxide, or alkylamine. In some embodiments, the alkyl can be substituted by 1-3 substituents selected from halo and $C_1$-$C_4$ alkoxy. The alkyl groups herein can also include one-two unsaturated bonds (double bonds), provided those bonds do not include the carbon directly attached to P or N in a phosphine, phosphonate, phosphinate, phosphine oxide or amine.

Preferred alkyl phosphines include compounds of the formula $[(C_4$-$C_{12})_3]P$. Preferred alkyl phosphine oxides include compounds of the formula $[(C_4$-$C_{12})_3]PO$. Preferred alkylamines include compounds of formula $(C_4$-$C_{12})_2NH$ and $(C_4$-$C_{24})NH_2$, where each $C_4$-$C_{12}$ or $C_4$-$C_{24}$ alkyl is a straight or branched chain unsubstituted alkyl group. Preferred alkyl phosphonic acids and alkyl phosphinic acids include those having 1-15 carbon atoms and preferably 2-12 carbon atoms or 3-8 carbon atoms. Preferred alkyl carboxylates for use in the methods of the invention include $C_5$-$C_{24}$ alkyl groups with an attached carboxylic acid group, e.g., $(C_5$-$C_{24})$alkyl-COOH, where the alkyl can be straight chain, branched, cyclic or a combination of these. In some embodiments, the alkyl carboxylate has at least one double bond in its alkyl group.

"Hydrophobic" as used herein refers to a surface property of a solid, or a bulk property of a liquid, where the solid or liquid exhibits greater miscibility or solubility in a low-dielectric medium than it does in a higher dielectric medium. A nanocrystal that is soluble in organic solvents that are not miscible with water, such as ethyl acetate, dichloromethane, MTBE, hexane, or ether, is hydrophobic. By way of example only, nanocrystals that are soluble in a hydrocarbon solvent such as decane or octadecene and are insoluble in an alcohol such as methanol are hydrophobic.

"Hydrophilic" as used herein refers to a surface property of a solid, or a bulk property of a liquid, where the solid or liquid exhibits greater miscibility or solubility in a high-dielectric medium than it does in a lower dielectric medium. By way of example, a material that is more soluble in methanol than in a hydrocarbon solvent such as decane would be considered hydrophilic.

"Growth medium" as used herein refers to a mixture of reagents and/or solvents in which a nanocrystals is grown or in which a shell is grown on a nanocrystals. These growth media are well known in the art, and often include at least one metal, at least one chalcogenide (a compound of S, Se, or Te), and one or more alkyl phosphines, alkyl phosphine oxides, alkyl phosphonic acids, alkyl phosphinic acids, alkyl carboxylic acids, or alkylamines.

"Coordinating solvents" as used herein refers to a solvent such as TOP, TOPO, carboxylic acids, and amines, which are effective to coordinate to the surface of a nanocrystal. 'Coordinating solvents' include phosphines, phosphine oxides, phosphonic acids, phosphinic acids, amines, and carboxylic acids, which are often used in growth media for nanocrystals, and which form a coating or layer on the nanocrystal surface. They exclude hydrocarbon solvents such as hexanes, toluene, hexadecane, octadecene, and the like, which do not have heteroatoms that provide bonding pairs of electrons to coordinate with the nanocrystal surface. Hydrocarbon solvents that do not contain heteroatoms such as O, S, N or P to coordinate to a nanocrystal surface are referred to herein as non-coordinating solvents. Note that the term 'solvent' is used in its ordinary way in these terms and refers to a medium that supports, dissolves, or disperses materials and reactions between them, but which does not ordinarily participate in or become modified by the reactions of the reactant materials.

"Luminescence" refers to the property of emitting electromagnetic radiation from an object. Typically, the electromagnetic radiation is in the range of UV to IR radiation and can refer to visible electromagnetic radiation, for example light. Luminescence may result when a system undergoes a transition from an excited state to a lower energy state resulting in the release of a photon. The transition responsible for luminescence can be stimulated through the release of energy stored in the system chemically or kinetically, or can be added to the system from an external source, such as, for example by a photon or a chemical, thermal, electrical, magnetic, electromagnetic, physical energy source, or any other type of energy source capable of exciting the system. In some embodiments, 'luminescence' refers to fluorescence—emission of a photon that is initiated by excitation with a photon of higher energy (shorter wavelength) than the emitted photon.

"Exciting a system" or "exciting" or "excitation" refers to inducing the energy state of a system into a higher state than that of ground state. The term "excitation wavelength" refers to electromagnetic energy which may have a shorter wavelength than that of the emission wavelength that is used to excite the system. The "energy states" of the system described herein can be electronic, vibrational, rotational, or any combination thereof. The term "emission peak" refers to the wavelength that has the highest relative intensity within a characteristic emission spectra.

A typical single-color preparation of nanoparticles has crystals that are preferably of substantially identical size and shape. Nanocrystals are typically thought of as being spherical or nearly spherical in shape, but can actually be any shape. Alternatively, the nanocrystals can be non-spherical in shape. For example, the nanocrystal's shape can change towards oblate spheroids for redder colors. It is preferred that at least about 60%, at least about 70%, at least about 80%, at least about 90%, at least about 95%, and ideally about 100% of the particles are of the same size. Size deviation can be measured as root mean square ("rms") of the diameter, with less than about 30% rms, preferably less than about 20% rms, more preferably less than about 10% rms. Size deviation can be less than about 10% rms, less than about 9% rms, less than about 8% rms, less than about 7% rms, less than about 6% rms, less than about 5% rms, or ranges between any two of these values. Such a collection of particles is sometimes referred to as being "monodisperse". One of ordinary skill in the art will realize that particular sizes of nanocrystals, such as of semiconductor nanocrystals, are actually obtained as particle size distributions.

"Nanoparticle" as used herein refers to any particle with at least one major dimension in the nanosize range. Typically, a nanoparticle has at least one major dimension ranging from about 1 to 1000 nm.

Examples of nanoparticles include a nanocrystal, such as a core/shell nanocrystal, plus any tightly-associated organic coating or other material that may be on the surface of the nanocrystal. A nanoparticle can also include a bare core or core/shell nanocrystal, as well as a core nanocrystal or a core/shell nanocrystal having a layer of, e.g., TOPO or other material that is not removed from the surface by ordinary solvation. A nanoparticle may have a layer of ligands on its surface which may further be cross-linked; and a nanoparticle may have other or additional surface coatings that modify the properties of the particle, for example, solubility in water or other solvents. Such layers on the surface are included in the term 'nanoparticle.'

"Nanocrystal" as used herein refers to a nanoparticle made out of an inorganic substance that typically has an ordered crystalline structure. It can refer to a nanocrystal having a crystalline core, or to a core/shell nanocrystal, and may be 1-100 nm in its largest dimension, preferably about 1 to 50 nm in its largest dimension.

A core nanocrystal is a nanocrystal to which no shell has been applied; typically it is a semiconductor nanocrystal, and typically it is made of a single semiconductor material. It may be homogeneous, or its composition may vary with depth inside the nanocrystal. Many types of nanocrystals are known, and methods for making a nanocrystal core and applying a shell to it are known in the art. The nanocrystals provided herein are frequently bright fluorescent nanocrystals, and the nanoparticles prepared from them are typically also bright, e.g., having a quantum yield of at least about 10%, sometimes at least 20%, sometimes at least 30%, sometimes at least 40%, and sometimes at least 50% or greater. Nanocrystals generally require a surface layer of ligands to protect the nanocrystal from degradation in use or during storage.

"Quantum dot" as used herein refers to a nanocrystalline particle made from a material that in the bulk is a semiconductor or insulating material, which has a tunable photophysical property in the near ultraviolet (UV) to far infrared (IR) range.

"Water-soluble" is used herein to mean the item is soluble or suspendable in an aqueous-based solution, such as in water or water-based solutions or buffer solutions, including those used in biological or molecular detection systems as known by those skilled in the art. While water-soluble nanoparticles are not truly 'dissolved' in the sense that term is used to describe individually solvated small molecules, they are solvated and suspended in solvents that are compatible with their outer surface layer, thus a nanoparticle that is readily dispersed in water is considered water-soluble or water-dispersable. A water-soluble nanoparticle is also considered hydrophilic, since its surface is compatible with water and with water solubility.

"Hydrophobic nanoparticle" as used herein refers to a nanoparticle that is readily dispersed in or dissolved in a water-immiscible solvent like hexanes, toluene, and the like. Such nanoparticles are generally not readily dispersed in water; rather, they clump or precipitate from aqueous solutions.

Semiconductor nanocrystals can be made using techniques known in the art. See, e.g., U.S. Pat. Nos. 6,048,616, 5,990, 479, 5,690,807, 5,505,928 and 5,262,357, as well as International Patent Publication No. WO 99/26299, published May 27, 1999. These methods typically produce nanocrystals having a coating of hydrophobic ligands on their surfaces which protect them from rapid degradation. The nanocrystals are typically prepared in two steps that produce two distinct layers, a core and a shell.

In some embodiments, the nanoparticle provided herein is a member of a monodisperse population of nanoparticles of like composition. Monodisperse means that the particles are similar in size, and fall within about 30% of a particular mean dimension, preferably within about 20%, more preferably less than about 10%. The monodisperse particle population in some embodiments is characterized in that it exhibits less than about 10% rms deviation in the diameter, or largest dimension, of the core. In some embodiments, the monodisperse particle population exhibits less than about 5% rms deviation in the diameter, or largest dimension, of the core.

In some embodiments, a monodisperse population is produced by making a single batch of nanocrystals all together, and they have similar properties due to their production method. However, careful control of reaction conditions permits a user of the methods to produce nanocrystals of the invention consistently enough for separate batches to form a monodisperse population; and a monodisperse population can also be produced by careful control of conditions using continuous flow production methods.

Nanocrystal sizes are typically from about 1 nm to about 100 nm in diameter, sometimes from about 1 nm to about 50 nm in diameter, and sometimes from about 1 nm to about 25 nm in diameter. For a nanocrystal that is not substantially spherical, e.g. rod-shaped, it may be from about 1 nm to about 100 nm, or from about 1 nm to about 50 nm or 1 nm to about 25 nm in its smallest dimension.

Generally, a nanocrystal is a semiconductive particle, having a diameter or largest dimension in the range of about 1 nm to about 100 nm, or in the range of about 2 nm to about 50 nm, and in certain embodiments, in the range of about 2 nm to about 20 nm or from about 2 to about 10 nm. More specific ranges of sizes include about 0.5 nm to about 5 nm, about 1 nm to about 50 nm, and about 1 nm to about 20 nm Specific size examples include about 0.1 nm, about 0.5 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 25 nm, about 30 nm, about 35 nm, about 40 nm, about 45 nm, about 50 nm, and ranges between any two of these values. In some embodiments, a core nanocrystal less than about 10 nm in diameter, or less than about 7 nm in diameter, or less than about 5 nm in diameter.

In some embodiments, provided herein is a nanocrystal core that is less than about 10 nm in diameter, or less than about 7 nm in diameter, or less than about 5 nm in diameter. Certain nanocrystal cores are about 2-5 nm in diameter.

In some embodiments, provided herein is a core/shell nanocrystal that is less than about 10 nm in diameter. In some embodiments the core/shell nanocrystal is less than about 8 nm in diameter, or less than about 6 nm in diameter.

In some embodiments, provided herein is a coated core/shell nanocrystal that is less than about 20 nm in diameter. The coating can comprise an organic material, such as a layer of TOP or TOPO or other coordinating ligands that can make the nanocrystal or quantum dot soluble in hydrophobic media, or a hydrophilic coating such as an amphiphilic (AMP) coating as discussed in U.S. Pat. No. 7,108,915, which is incorporated herein by reference, which provides a water-soluble or water dispersable composition.

The nanoparticles provided herein are generally fluorescent, due to the presence of a fluorescent nanocrystal core. The nanoparticles are often characterized by a fluorescence maximum in the visible spectrum, and frequently the fluorescence of a monodisperse population of ZnTe nanocrystals is characterized in that when irradiated the population emits light for which the peak emission is in the spectral range of from about 420 nm to about 670 nm.

Nanocrystals can be characterized by their percent quantum yield of emitted light. For example, the quantum yield of the nanoparticles provided herein can be greater than about 10%, greater than about 20%, greater than about 30%, greater than about 40%, greater than about 50%, greater than about 60%, greater than about 70%, greater than about 80%, greater than about 90%, and ranges between any two of these values. The quantum yield is typically greater than about 30%, and preferably greater than 50% or greater than 70%.

It is well known that the color (emitted light) of the semiconductor nanocrystal can be "tuned" by varying the size and composition of the nanocrystal. Nanocrystals preferably absorb a wide spectrum of wavelengths, and emit a narrow wavelength of light. The excitation and emission wavelengths are typically different, and non-overlapping. The nanoparticles of a monodisperse population may be characterized in that they produce a fluorescence emission having a relatively narrow wavelength band. Examples of emission widths (FWHM) for the nanoparticles provided herein include less than about 200 nm, less than about 175 nm, less than about 150 nm, less than about 125 nm, less than about 100 nm, less than about 75 nm, less than about 60 nm, less than about 50 nm, less than about 40 nm, less than about 30 nm, less than about 20 nm, and less than about 10 nm. The width of emission is preferably less than about 50 nm, and more preferably less than about 20 nm at full width at half maximum of the emission band (FWHM). Particular monodisperse populations of nanoparticles provided herein exhibit a width (FWHM) of about 30 nm to about 50 nm. The emitted light preferably has a symmetrical emission of wavelengths. The emission maxima can generally be at any wavelength from about 200 nm to about 2,000 nm. Examples of emission maxima include about 200 nm, about 400 nm, about 600 nm, about 800 nm, about 1,000 nm, about 1,200 nm, about 1,400 nm, about 1,600 nm, about 1,800 nm, about 2,000 nm, and ranges between any two of these values. In certain embodiments, the emission maxima ranges from about 425 nm to about 625 nm; or about 650 nm; or about 670 nm. In certain embodiments, a green color is desirable, so a wavelength in the green region (e.g., about 510 nm to about 500 nm) is selected.

The nanoparticles described herein may be a core/shell nanocrystal having a nanocrystal core covered by a semiconductor shell. The thickness of the shell can be adapted to provide desired particle properties. The thickness of the shell can affect fluorescence wavelength, quantum yield, fluorescence stability, and other photostability characteristics.

In some embodiments, a core semiconductor nanocrystal is modified to enhance the efficiency and stability of its fluorescence emissions, prior to ligand modifications described herein, by adding an overcoating layer or shell to the semiconductor nanocrystal core. Having a shell may be preferred, because surface defects at the surface of the semiconductor nanocrystal can result in traps for electrons, or holes that degrade the electrical and optical properties of the semiconductor nanocrystal core, or other non-radiative energy loss mechanisms that either dissipate the energy of an absorbed photon or at least affect the wavelength of the fluorescence emission slightly, resulting in broadening of the emission band. An insulating layer at the surface of the semiconductor nanocrystal core can provide an atomically abrupt jump in the chemical potential at the interface that eliminates energy states that can serve as traps for the electrons and holes. This results in higher efficiency in the luminescent processes.

Suitable materials for the shell include semiconductor materials having a higher bandgap energy than the semiconductor nanocrystal core. In addition to having a bandgap energy greater than the semiconductor nanocrystal core, suitable materials for the shell should have good conduction and valence band offset with respect to the core semiconductor nanocrystal. Thus, the conduction band is desirably higher and the valence band is desirably lower than those of the core semiconductor nanocrystal. The preparation of a coated semiconductor nanocrystal may be found in, e.g., Dabbousi et al. (1997) *J. Phys. Chem. B* 101:9463, Hines et al. (1996) *J. Phys. Chem.* 100: 468-471, Peng et al. (1997) *J. Am. Chem. Soc.* 119:7019-7029, and Kuno et al. (1997) *J. Phys. Chem.* 106: 9869. It is also understood in the art that the actual fluorescence wavelength for a particular nanocrystal core depends upon the size of the core as well as its composition, so the categorizations above are approximations, and nanocrystal cores described as emitting in the visible or the near IR can actually emit at longer or shorter wavelengths depending upon the size of the core.

In some embodiments, the metal atoms of a shell layer on a nanocrystal core are selected from Cd, Zn, Ga and Mg. The second element in these semiconductor shell layers can be selected from S, Se, Te, P, As, N and Sb. ZnSe has been found to be a suitable shell for the ZnTe cores provided herein; however, other materials, or mixtures or alloys of ZnSe with other materials, may also be used.

The nanocrystal can be of any suitable size; typically, it is sized to provide fluorescence in the UV-visible portion of the electromagnetic spectrum, since this range is convenient for use in monitoring biological and biochemical events in relevant media. The relationship between size and fluorescence wavelength is well known, thus making nanoparticles smaller may require selecting a particular material that gives a suitable wavelength at a small size, such as ZnTe as the core of a core/shell nanocrystal. Typically core/shell nanocrystals of interest are from about 1 nm to about 100 nm in diameter, and sometimes from about 1 nm to about 50 nm, or from about 1 nm to about 25 nm. For a nanocrystal that is not substantially spherical, e.g. rod-shaped, it may be from about 1 nm to about 100 nm, or from about 1 nm to about 50 nm, or from about 1 nm to about 25 nm, in its smallest dimension.

The nanoparticles can have surface coatings adding various functionalities. For example, the nanocrystals can be coated with lipids, phospholipids, fatty acids, polynucleic acids, polyethylene glycol, primary antibodies, secondary antibodies, antibody fragments, protein or nucleic acid based aptamers, biotin, streptavidin or other avidin derivatives, proteins, peptides, small organic molecules, and organic or inorganic dyes. In certain embodiments, ZnTe nanocrystals are treated with a coating comprising a cationic polymer such as polyarginine. Certain embodiments are directed towards nanoparticles coated with phospholipids. Other semiconductor nanocrystal coating materials, e.g., the AMP polymers discussed above also can be used.

Spectral characteristics of nanoparticles can generally be monitored using any suitable light-measuring or light-accumulating instrumentation. Examples of such instrumentation are CCD (charge-coupled device) cameras, video devices, CIT imaging, digital cameras mounted on a fluorescent microscope, photomultipliers, fluorometers and luminometers, microscopes of various configurations, and even the human eye. The emission can be monitored continuously or at one or more discrete time points. The photostability and sensitivity of nanoparticles allow recording of changes in electrical potential over extended periods of time.

Additional methods of assaying the emission from the nanoparticle(s) include measuring changes in light intensity, light polarization, light absorption, color of the emission, emission lifetime or half-life, or the "blinking" pattern.

Nanoparticles can be synthesized in shapes of different complexity such as spheres, rods, discs, triangles, nanorings, nanoshells, tetrapods, and so on. Each of these geometries have distinctive properties: spatial distribution of the surface charge, orientation dependence of polarization of the incident light wave, and spatial extent of the electric field. In many embodiments, the nanocrystals provided herein are roughly spherical. While methods for synthesizing several different nanocrystal types are known, each nanocrystal material and combination of materials can introduce unexpected complications. Certain unexpected difficulties with making ZnTe nanocrystal cores and applying semiconductor shells to those cores have been identified and solutions to these problems are provided herein, including improved methods specifically adapted for use with ZnTe nanocrystal core production and modification.

ZnTe Nanocrystal Cores

In one aspect, provided herein is a semiconductor nanocrystal that comprises zinc and tellurium. In certain embodiments, the nanocrystal consists primarily or essentially of zinc and tellurium (ZnTe). Certain semiconductor nanocrystals provided herein include a ZnTe core and a passivating shell. Described herein is a unique set of reaction conditions for preparing ZnTe cores. The core can be made to achieve suitable quantum yields. These synthesis procedures should be conducted with special care to exclude moisture and oxygen, thus solvents and reagents were carefully purged of oxygen before mixing and all transformations should be conducted under inert atmosphere throughout the process of forming the ZnTe core and adding a shell to it.

Figure 1A:
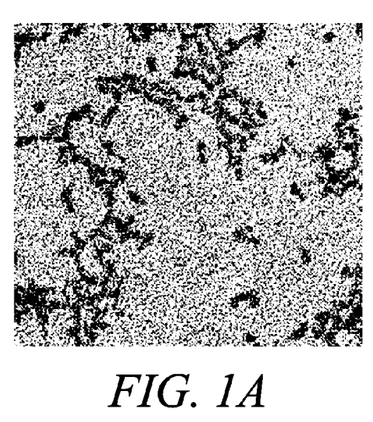
FIG. 1 shows how increasing reaction temperature improved the morphology of ZnTe nanocrystal cores: (A) 290° C., (B) 325° C., and (C) 350° C.
Figure 1B:
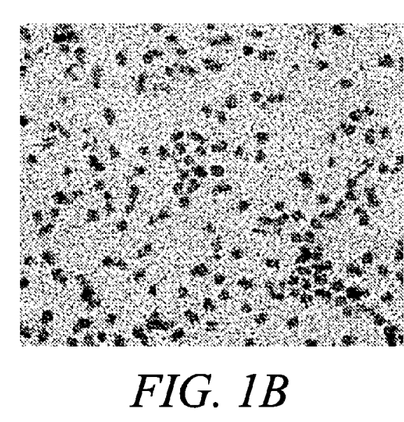
Figure 1C:
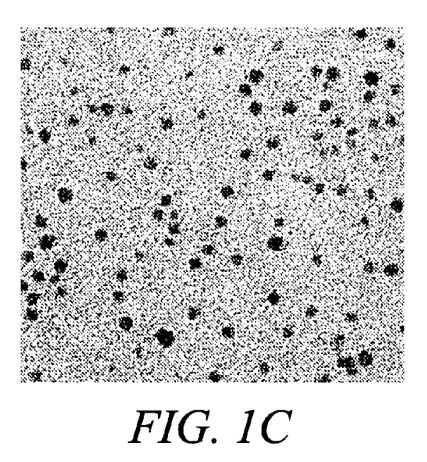

The methods described herein address various insufficiencies in current nanocrystal production methods and complications associated with working with zinc and tellurium as starting materials. Efforts to make high-quality ZnTe nanocrystal cores have focused on substituting zinc and tellurium precursors in existing methods for preparation of other chalcogenide-containing nanocrystals (e.g., CdSe). Although methods for producing CdSe cores are well known, adapting those methods to make ZnSe or ZnTe cores has been inefficient or ineffective. For example, reaction of Cd(TDPA) with Se in TOP (TOPSe) is known to work well for preparation of CdSe cores. However, when used to react Zn(TDPA) with (TMS)$_2$Se under the same conditions, the synthesis provided polydisperse particles in a very low yield. Thus, this product, produced by substitution of the cadmium with zinc, is not acceptable for use in core/shell nanocrystal preparation. The low particulate yield may be due to insufficient nucleation. Use of a more reactive Zn precursor, such as ZnEt$_2$, can provide a better particulate yield, and can produce high quality ZnSe nanocrystals with a fluorescence maximum at about 420 nm. When used with tellurium in TOP (TOPTe) in hexadecylamine as the solvent, the reaction with ZnEt$_2$ produces irregular particle shapes, which are not of sufficient quality to use in shell-forming reactions. For some applications, regular particle shapes (e.g., spherical particle shapes) are preferred. Higher temperatures (350° C.) can produce more regular nanocrystal particle shapes, but the product includes zinc particles along with nanocrystals, suggesting that the diethyl zinc precursor is too reactive for these conditions. FIG. 1 depicts the improved nanocrystal morphology associated with increasing reaction temperature from 290° C. to 325° C. and to 350° C. Diethyl zinc can be replaced with various alkyl carboxylic acid salts of zinc, e.g., Zn(O$_2$CR)$_2$, where R represents an alkyl group that can be saturated or unsaturated. The identity of the R group can have a dramatic effect on the quality of the nanocrystals produced. Where R is a saturated alkyl group (e,g, stearate), the reaction produces little nanocrystal formation. Unexpectedly, when the undecylenate salt (an unsaturated alkyl carboxylic acid salt) is used rather than a saturated alkyl group, good quality fluorescent nanocrystals can be obtained.

While not being limited to a particular theory, it is believed that the unsaturated alkyl carboxylic acid salt provides a weak reductant to facilitate the core-forming reaction. This may be due to mismatch between the oxidation states of the tellurium and zinc precursors being used: the zinc undecylenate is in a +2 oxidation state under the reaction conditions, but the tellurium precursor R$_3$PTe (a complex of trialkylphosphine and tellurium) provides Te$^0$ under the reaction conditions. It is believed that the uncharged tellurium species cannot readily react with Zn$^{+2}$, and that reduction of either Te$^0$ to Te$^{2-}$, or of Zn$^{+2}$ to Zn$^0$ is required for reaction to occur. Undecylenate from the Zn-containing precursor is believed to provide this reducing capacity under the reaction conditions described herein, probably by reducing Te$^0$ to Te$^{2-}$. Reaction of the 'matched' active species can then occur.

Two precursors are 'matched' when they are in an oxidation state that permits them undergo immediate reaction with each other. For example, two neutral species, such as Te$^0$ and Zn$^0$, or two ionic species having complementary charges, such as Te$^{2-}$, and Zn$^{+2}$ are considered 'matched.' Two precursors are considered 'mismatched' where they provide species that cannot react to form a neutral species unless an electron transfer agent is present to adjust the oxidation state of one of the precursors to provide 'matched' species capable of undergoing reaction. Frequently, mismatched precursors are used where one precursor provides an ionic species and the other precursor provides a non-ionic (i.e., neutral) species under the reaction conditions. For example, Te$^0$ and Zn$^{2+}$ are mismatched precursors. Precursors that provide two ionic species having the same charge (i.e., two cations or two anions) would also be 'mismatched.'

It is believed that use of a reductant that is sufficiently weak (e.g., undecylenate) allows this reaction to occur at a slow and controlled rate, suitable for promoting nanocrystal growth. However, these conditions generally are not ideal for promoting nucleation, because the reaction is too slow. Ideal nanocrystal formation conditions typically involve rapid nucleation to provide a large number of particles, then no further nucleation during the growth stage. If all nucleation occurs quickly, the growth stage can produce highly consistent particle size resulting in a monodisperse particle distribution. If nucleation continues during growth stage, a mixture of particle sizes is more likely to be produced. The methods provided herein balance the need for rapid nucleation and slow and controlled growth. An exemplary method to make ZnTe nanocrystals achieves this balance by using a Zn$^{2+}$ salt in combination with a Te$^0$ precursor, such as R$_3$PTe. The reaction can be carried out in the presence of a weak reductant. Optionally, the reductant can be present in a solvent component such as an amine, a phosphine or an alkyl carboxylic acid. In certain cases, a solvent is chosen that can function as the weak reductant (e.g., an amine or phosphine). In some embodiments, the weak reductant is provided by an unsaturated alkyl group. For example, it can be provided by an unsaturated alkyl carboxylic acid salt used as a zinc precursor. Representative zinc precursors include, for example, Zn(O$_2$CR)$_2$ and Zn(O$_2$CR)X, where each R is an unsaturated alkyl group having 4-24 carbons, and each X is another anion such as halide, phosphonate, phosphinate, sulfonate, and the like. Certain embodiments utilize an unsaturated alkyl group having 18 carbon atoms. Exemplary zinc precursors include oleate or undecylenate salts of Zn$^{2+}$.

While the use of a weak reductant provides an advantageous means to support nanocrystal growth, it does not necessarily provide ideal conditions for nucleation. Ideally, nucleation occurs quickly and essentially all at once, to produce a monodisperse population of nanocrystals.

In order to further improve the preparation of ZnTe nanocrystals, methods are provided for inducing nucleation as a rapid and short-lived phase under the reaction conditions. An effective method for inducing nucleation involves addition of a small amount of a stronger reducing agent at the beginning of the reaction. The quantity of the stronger reductant is sufficient to provide the desired amount of nucleation, by reducing an appropriate amount of the Te or Zn precursor. Generally, the amount of the strong reducing agent can be about 0.1 equivalents to about 2 equivalents of Zn$^{2+}$, however, other amounts also can be used. In some embodiments, the amount is less than about 1 equivalent of the Zn$^{2+}$ or, in some cases, less than about 2 equivalents of the Zn$^{2+}$. Other processes can utilize less than 0.2 equivalents of Zn$^{2+}$. A variety of chemical reducing agents can be used for this purpose, including tertiary phosphines, secondary phosphines, primary phosphines, amines, hydrazines, hydroxyphenyl compounds, hydrogen, hydrides, metals, boranes, aldehydes, alcohols, thiols, reducing halides, polyfunctional reductants, and mixtures thereof. In a specific embodiment, lithium triethylborohydride is used. In certain embodiments, the reductant is a cathode. Alternatively, in order to induce nucleation, a small amount of 'matched' precursors can be used along with a mismatched pair in a larger amount, suitable for supporting growth after nucleation has occurred. For example, a small amount of a more reactive zinc precursor like diethyl zinc can be used with R$_3$PTe, in combination with a larger amount of a Zn$^{2+}$ precursor. The Zn$^0$ precursor, e.g. diethyl zinc, can be used in sufficient quantity to induce a desired amount of nucleation. Once it has been consumed, which occurs quickly at an appropriate reaction temperature, the Zn$^{2+}$ precursor is present in sufficient quantity for a desired extent of growth, to produce a desired nanocrystal size. The nanocrystal size can be determined readily during the growth phase by monitoring the fluorescence wavelength.

In other embodiments, the method involves adding a weak reductant, such as a phosphine, amine or alkene to the solvent to promote nanocrystal growth. The amount of the weak reducing agent can be in excess of the number of equivalents of the $Zn^{2+}$. Alternatively, an amount of a $Te^{2-}$ precursor can be added to the solvent to initiate nanocrystal formation, wherein the amount of the $Te^{2-}$ precursor is less than 1 equivalents of the $Zn^{2+}$.

Figure 2:
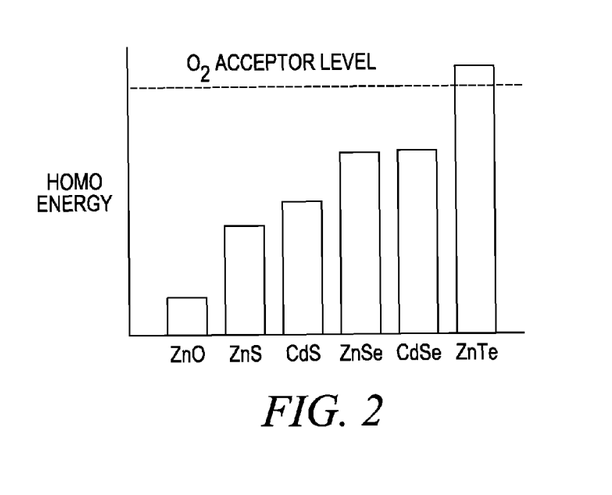
FIG. 2 shows a plot of HOMO energy for various nanocrystal core materials relative to the oxygen acceptor level. Of the materials shown, only ZnTe has a HOMO energy above the oxygen acceptor level. ZnTe nanocrystal cores are, therefore, especially sensitive to oxygen and particularly benefit from a protective shell.

A special problem arises with tellurium containing nanocrystals and their production, because such nanocrystals tend to be extremely sensitive to air and moisture. For example, as FIG. 2 illustrates, ZnTe nanocrystals can react with oxygen when in its ground state, i.e., it does not require photochemical activation for oxidation to occur if oxygen is present. In addition, the $Zn^{2+}$ precursor is an especially 'hard' Lewis acid, and interacts very strongly with any moisture or hydroxide present, since oxygen is a 'hard' Lewis base. It is therefore important to take extra precautions to exclude moisture from a ZnTe nanocrystal formation reaction.

The solvent for these core-forming reactions typically comprises an amine with hexadecylamine as one typical example Amine solvents can be difficult to purify sufficiently for the ZnTe nanocrystal reactions, because of the especially high sensitivity the reaction components and products exhibit toward moisture and air. While nanocrystal preparations are typically done with purified solvents and reagents, and under inert atmosphere, further special precautions and steps are taken for purifying amine solvents used to prepare ZnTe nanocrystals. The amine to be used as solvent for these reactions is placed in a flask which is repeatedly evacuated then filled with anhydrous inert atmosphere. Anhydrous NaOH or KOH, having been dried under vacuum at over 100° C., is then added to the amine solvent, and the suspension is stirred for at least 8 hours. The amine is filtered under inert atmosphere to remove the solids, and the amine is then distilled under inert atmosphere, and stored under an inert atmosphere.

It has been found that under the severe reaction conditions, e.g., temperatures of over 250° C., and frequently 300° C. or higher, the amine solvent can react with carboxylic acids present in the reaction mixture to form an amide. The formation of water as a by-product and the consumption of the carboxylic acid solvent by amide formation can be deleterious for reactions using Zn, due to the high affinity Zn has for oxygen ligands. Thus, even the purified amine can become a source of water under the reaction conditions.

Figure 3:
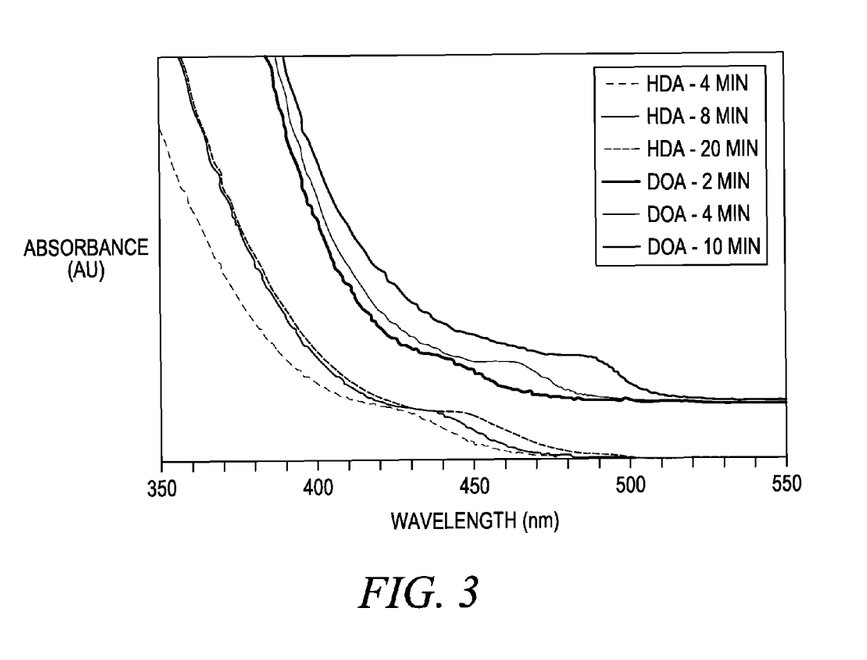
FIG. 3 shows a series of absorption spectra for nanocrystals prepared using two types of amine solvents after varying reaction times. The three curves on the lower/left side correspond to reaction using hexadecylamine (HDA) as solvent. The three upper curves correspond to reactions using dioctylamine, rigorously dried, as the solvent. Dioctylamine (DOA) is expected to reduce amide formation, and thereby reduce generation of water in the reaction mixture. The shift of the shoulders to longer wavelengths demonstrates growth of nanocrystals. The dioctylamine reactions were significantly faster. The results demonstrate that significant improvements in the ZnTe core formation reaction can be achieved when a secondary amine is used instead of the more conventional primary amine as a solvent for the reaction.

Methods are provided to avoid or at least significantly reduce the presence of water in the reaction process and thereby increase the product quality for ZnTe nanocrystals. The methods generally utilize an amine solvent. Any type of amine solvent can be used, however secondary and tertiary amines are generally preferred, since they are less likely to result in amide formation. In particular, secondary amines, $R_2NH$, where each R is independently a $C_4$-$C_{24}$ alkyl group, significantly enhance the quality and yield of ZnTe nanocrystals using the methods described herein. Preferably, the alkyl groups of the alkyl contain a total of at least about 10 carbon atoms. One suitable choice for the solvent is dioctylamine ($R_2NH$, where each R is a $C_8$ alkyl group, preferably n-octyl), which can be used successfully in place of a primary amine such as hexadecylamine. FIG. 3 demonstrates how use of a secondary amine, in place of a primary amine, improves the formation of ZnTe nanocrystal cores. Using dioctylamine (DOA) dried and purified as described above, as solvent for a reaction of zinc oleate with TOPTe produced ZnTe nanocrystals having a fluorescence maximum emission at about 525 nm wavelength. These nanocrystals were monodisperse as demonstrated by a FWHM of under 50 nm for the population of nanocrystals produced. The ZnTe nanocrystals were purified using conventional methods, without exposure to moisture or air in order to protect their photochemical activities.

Any of the methods provided herein can be employed in a flow reaction system or in a batch process reaction.

Shell Formation

Especially in view of the water and moisture sensitivity of ZnTe nanocrystals, it is often desirable to provide a shell of a semiconductor material over the ZnTe nanocrystal. ZnTe core/shell nanocrystals are useful in many typical 'quantum dot' applications. A number of candidates for shell material are known, as are methods to apply the shell. However, application of ZnS shells using standard protocols have failed to produce viable shells for ZnTe nanocrystal cores.

Initial efforts at developing suitable shells for the ZnTe nanocrystals described herein focused on modifying existing shell reaction protocols and materials useful for well-known types of core materials. For example, one process involves deposition of a ZnS shell on ZnSe nanocrystals using diethyl zinc and a phosphinic acid to produce a zinc phosphinate salt, which was then reacted with the ZnSe cores and $(TMS)_2S$ to form a thick protective ZnS shell.

However, when the same conditions were used to apply a shell of ZnS to a ZnTe nanocrystal core, the product was an irregular shell that did not protect the nanocrystal's fluorescence. Without wishing to be bound by theory, this suggested that lattice match between the ZnS and ZnTe was insufficient to provide an epitaxial, protective shell. Comparison of lattice parameters suggested ZnSe may be a better match for a ZnTe nanocrystal. However, use of the same conditions used for applying ZnS shells was unsuccessful. In particular, when ZnTe cores were treated with a zinc phosphinate salt in dioctylamine and warmed, the cores unexpectedly dissolved. The addition of oleic acid, which is typically used to provide a protective ligand for the nanocrystals, was likely too corrosive with ZnTe nanocrystal cores, and destroyed the nanocrystals.

An acid-free medium has been found to minimize destruction of the ZnTe nanocrystal cores. Such a medium can be formed using zinc salts along with Se in TOP (TOPSe) in dioctylamine to form a shell on the ZnTe cores. Various zinc salts can be used including, but not limited to, phosphonate and phosphinate salts, zinc carboxylic acid salts; and mixed salts having one carboxylic acid ligand and one other ligand, such as halide.

TOPSe, which is typically added last, can be added quickly or slowly. The rate of addition is not critical, because in the absence of a strong reductant, zinc selenide shell formation is preferred over nucleation.

The zinc precursor is preferably an unsaturated alkyl carboxylic acid salt, such as oleate or undecylenate. For example, exemplary zinc salts include $Zn(oleate)_2$, $Zn(oleate)Cl$, $Zn(undecylenate)_2$ and $Zn(undecylenate)Cl$.

Also provided herein is a method for applying a shell of ZnSe to a sensitive nanocrystal core such as ZnTe. The method involves use of a zinc salt having at least one unsaturated carboxylate ligand on the zinc ($RCO_2^-$, where R is a $C_4$-$C_{24}$ unsaturated alkyl group, which can be straight-chain, branched chain, cyclic, or a combination of these, and contains at least one, and preferably only one, carbon-carbon double bond). In some embodiments, this zinc salt is used in combination with a $Se^0$ selenium precursor such as $R_3PSe$ to form a shell on a ZnTe nanocrystal core. In some embodiments, the zinc salt is $Zn(O_2CR)_2$ or $Zn(O_2CR)Cl$, and an amount of the zinc salt that is sufficient to provide enough reduced selenium to provide the desired amount of shell is used. Preferably, the solvent is a secondary amine, such as a dialkylamine or a trialkylamine, such as dioctylamine or other dialkylamines as described above for use as the solvent in the ZnTe nanocrystal core formation.

The zinc salt can be prepared in situ during the shell forming reaction by using diethyl zinc or other dialkyl zinc species, and allowing the dialkyl zinc to react with the unsaturated carboxylic acid. The reaction of diethyl zinc with oleic acid, for example, provides zinc oleate, and produces ethane as a byproduct. Alternatively, using zinc chloride plus oleic acid forms the zinc salt having at least one unsaturated carboxylic acid ligand.

Figure 5:
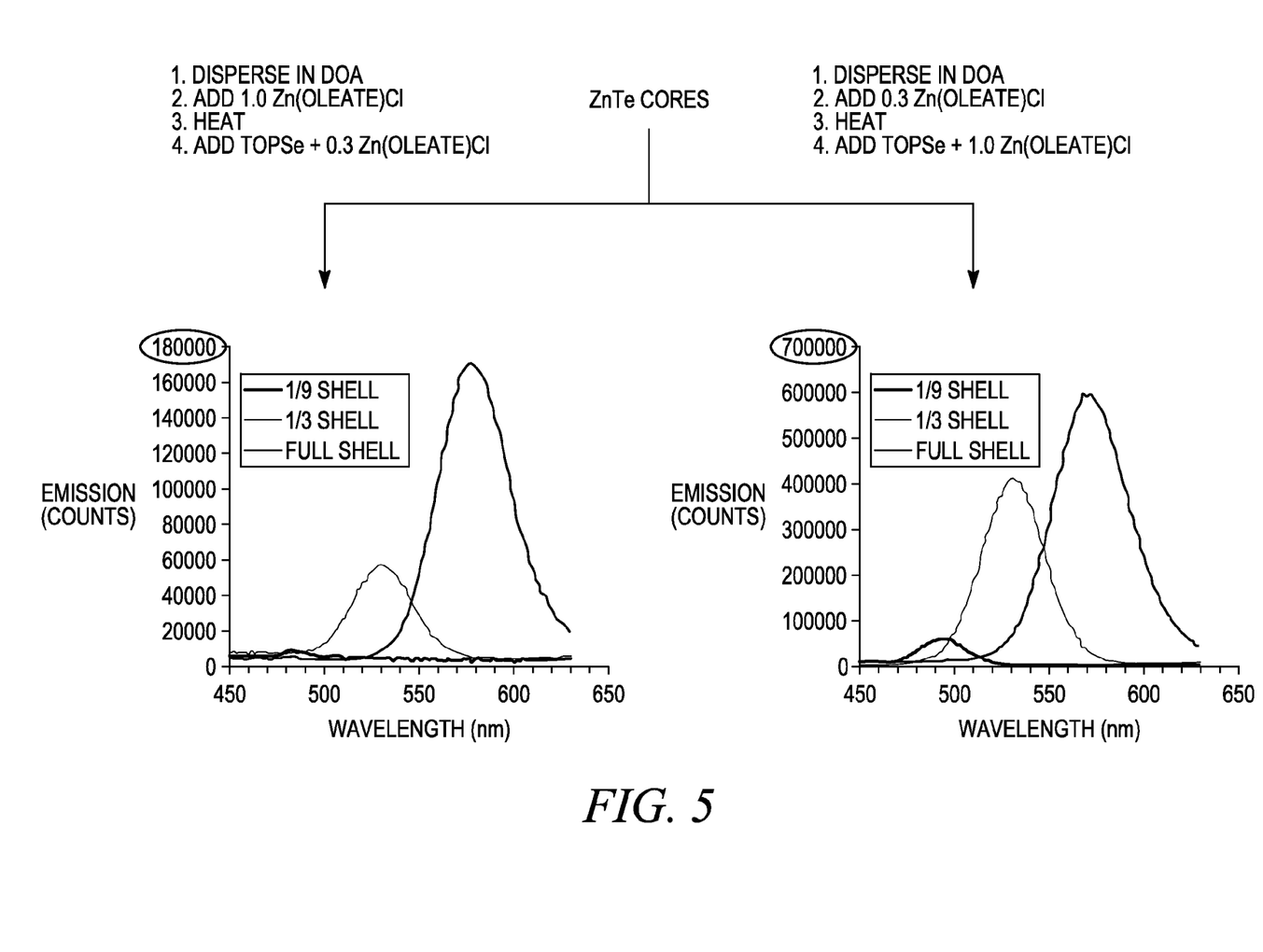
FIG. 5 shows how pre-treatment of ZnTe cores with a zinc salt prior to addition of a selenium precursor to the shell-forming reaction improves the brightness of the nanocrystal products. Note the difference in the two scales for the emission intensities from the two reactions.

The quality of the nanocrystal product can be further improved by pre-treating the ZnTe cores with an amine solvent containing a zinc salt prior to addition of the selenium precursor. The solvent can include any type of amine. However, pre-treatment with secondary amines (e.g., dialkylamine), in particular, can have certain advantages. In one exemplary method, ZnTe cores are heated with about 0.3 equivalents of the Zn salt (e.g., Zn(oleate)Cl) prior to addition of the selenium precursor. Pretreatment significantly improves the brightness of the nanoparticles. FIG. 5 illustrates the improvement in nanocrystal quality when ZnTe cores are pre-treated with a zinc salt (Zn(oleate)Cl) at elevated temperature prior to adding the selenium precursor. It also was found that using too much of the zinc salt for this pretreatment reduces the brightness (quantum yield) of the nanocrystal product. The two plots of FIG. 5 demonstrate that the order and amount of zinc salt addition impacts the emission spectra of the resulting core/shell nanoparticles. In one pre-treatment method, ZnTe cores were dispersed in dioctylamine (DOA) to which was added 1.0 equivalent of Zn(oleate)Cl. The reaction mixture was heated and then to it added TOPSe and 0.3 equivalents of Zn(oleate)Cl. In another method, ZnTe cores were dispersed in DOA to which was added 0.3 equivalents Zn(oleate)Cl. The reaction mixture was heated and to it was added TOPSe and 1.0 equivalent Zn(oleate)Cl. The pre-treated ZnTe cores were treated with varying amounts of shell material. Referring to the two plots of FIG. 5, each plot depicts three emission spectra for cores treated with a full amount of shell material and ⅓ and ⅑ of this amount of shell material, where pre-treated ZnTe cores not having a reduced amount of shell material yielded the most intense emission.

Thus in another aspect, a method is provided for increasing the brightness of a nanocrystal having a ZnTe core and a zinc chalcogenide shell, comprising heating the ZnTe cores with an amount of a zinc salt in a dialkylamine solvent prior to adding the second (chalcogenide) shell precursor and remaining zinc salt. This process can increase the brightness of core/shell nanocrystals by over 100%, and as much as 200%, relative to a process where the shell forming reaction is done by adding all of the zinc shell precursor before the second shell precursor is added.

Nanocrystals made by this method exhibit high quantum yields, and are stable in storage. Indeed, they can be treated with an amphiphilic polymer coating to render them water soluble, and they exhibit excellent stability in water. Alternatively, they can be dispersed in a hydrophobic solvent such as hexanes without significant loss of quantum yield for a period of at least about 3 weeks. These nanocrystals can also be surface-modified in other ways, e.g. by PEGylation or conjugation to a bioaffinity molecule to enhance their chemical stability. Although ZnTe nanocrystals have relatively high chemical stability, their photostability is lower, and may be improved by further treatment or additional layers of shell material.

Figure 4:
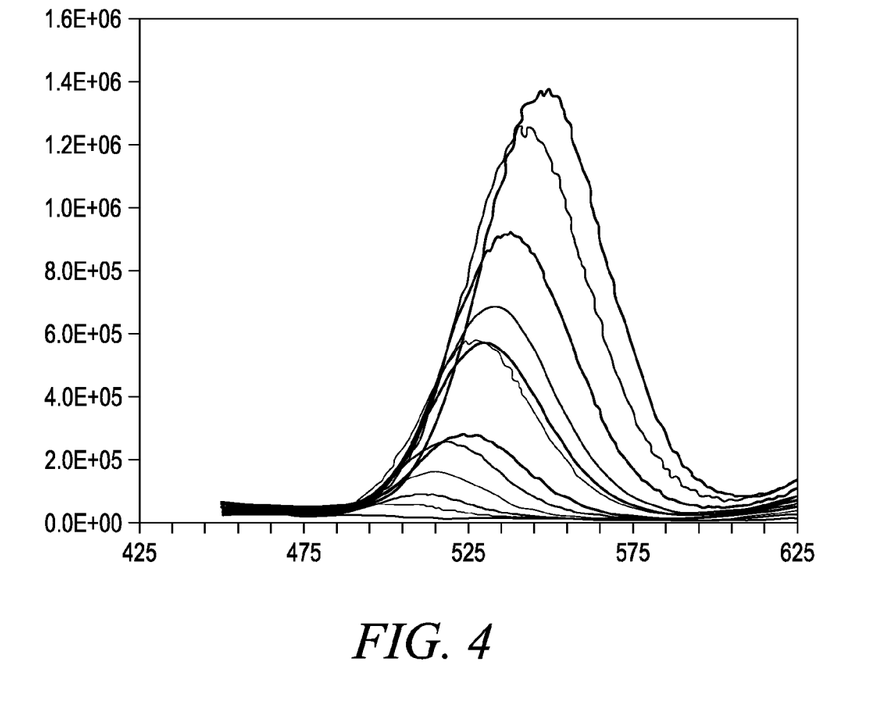
FIG. 4 shows a plot of fluorescence emission as a function of wavelength from the reaction mixture during growth of ZnSe shells on ZnTe nanocrystals. As the reaction progressed, the fluorescence emission increased sharply as nanocrystals formed and grew, and the maximum wavelength increased as nanocrystals became larger, as illustrated by increasing fluorescence intensity and red-shifting of the fluorescence maximum.

In certain embodiments, ZnTe containing nanocrystals are provided that emit in the visible portion of the electromagnetic spectrum. Certain ZnTe nanocrystals emit in the green portion of the spectrum. For example, the conditions provided herein can yield core/shell nanocrystals having a maximum fluorescence emission at 525 nm or above, and up to about 560 nm. For example, a desired green color can be achieved with a nanocrystal having a ZnTe core onto which is deposited a passivating shell material. Various shell materials can be used with green emitting ZnTe nanocrystals. For example, the shell may include one or more of ZnSe, ZnTe, ZnS, MgS, MgSe, MgTe, BeSe, and BeTe. In certain embodiments, a ZnSe or ZnS shell provides nanoparticles with particularly desirable photoluminescence properties. The shell can be formed from a combination (e.g., a mixture or alloy) of shell materials or can be formed by depositing multiple layers onto the nanocrystal core. Certain nanocrystal compositions provided herein include a ZnTe core and a ZnSe shell. Another exemplary shell can include a layer of ZnSe shell proximal to the ZnTe core and a shell layer of ZnS deposited thereon. In one embodiment, a ZnTe nanocrystal having a diameter of about 4 nm is combined with a shell of ZnSe about 1 nm thick (making the ZnTe/ZnSe particle about 6 nm in diameter), coated with an additional shell of ZnS that is about 1 nm thick. In certain embodiments, the ZnSe and ZnS shells provide a red-shift that moves the small ZnTe core to a wavelength of about 525 nm to about 560 nm In other embodiments, ZnTe cores having ZnSe shells exhibit an unexpected shift in peak emission wavelength to longer wavelengths (e.g., from about 525 nm to about 600 nm or more) as a function of shell thickness. As the thickness of the shell increases, the peak emission wavelength of ZnTe/ZnSe nanoparticles shifts dramatically to the red. For example, in some embodiments, as the thickness of the shell increases, the peak emission wavelength of ZnTe/ZnSe nanoparticles shifts to about 525 nm; or about 550 nm; or about 575 nm; or about 600 nm. The effect of the size of ZnTe/ZnSe nanoparticles on peak emission wavelength is illustrated, for example, in FIG. 4.

Other methods for increasing photostability of the ZnTe/ZnSe core/shell nanocrystals described herein include doping the ZnTe core with Se before adding the ZnSe shell. Methods for doping an additional material into a core nanocrystal are known in the art. Other options include using a shell comprising MgX or BeX, wherein X represents O, S or Se, in place of or in addition to the ZnSe shell described above. Other methods include adding a coating of phosphonic acid ligands to the nanocrystal. These ligands bind very tightly, particularly to a Zn-containing semiconductor surface, and thus provide extra protection for the surface.

Nanocrystals made by the described methods can be further modified by modifications of the ligands present on the nanocrystal surface as is known in the art. For example, the ligands on the surface of the nanocrystal can be exchanged for other ligands to introduce new properties such as water solubility to the nanocrystals. Methods for making nanocrystals with water-solubilizing ligand coatings are known in the art. For example, Adams, et al. (U.S. Pat. No. 6,649,138) provides methods to make water-soluble nanocrystals by applying a coating of amphipathic polymeric material to the surface of a hydrophobic nanocrystal. The methods start with a hydrophobic nanocrystal, such as one described herein having a coating of hydrophobic ligands, such as trialkyl phosphines, trialkyl phosphine oxides, alkylamines, or alkylphosphonic acids. To this is added an outer layer comprised of a multiply amphipathic dispersant molecule comprising at least two hydrophobic domains and at least two hydrophilic domains. In some embodiments, the amphiphilic polymer comprises an acrylic acid or methacrylic acid polymer having some acrylic acid groups converted into amides with hydrophobic amine groups, such as monoalkyl amines or dialkylamines having at least 4-12 carbons per alkyl group; and having some free carboxylic acid groups to promote water solubility. These and other suitable amphiphilic dispersants suitable for such use are described at columns 14-18 of Adams et al, which is incorporated herein by reference.

Thus in one aspect, nanocrystals include a coating of amphiphilic dispersant (e.g., as described in U.S. Pat. No. 6,649,138). The nanocrystals are thereby rendered water-soluble, making them suitable for use in a variety of methods in which nanocrystals such as quantum dots are known to be used. Another option for improving the water-solubility of the nanocrystals described herein is treatment with dihydrolipoic acid (DHLA). Certain embodiments provide solubilized nanocrystals and methods of making them.

Other methods for rendering nanocrystals water-soluble are described by Naasani, et al., in U.S. Pat. No. 6,955,855 and U.S. Pat. No. 7,198,847. These methods involve coating the nanocrystal with small water-solubilizing ligands, such as imidazole-containing compounds like dipeptides. Suitable imidazole-containing compounds are described at column 7 of the '855 Naasani patent.

By the term "imidazole-containing compound" is meant, for purposes of the specification and claims to refer to a molecule that has at least one imidazole group (e.g., imidazole ring) available for binding a metal such as zinc or other metal cation, or substrate containing such cation. Preferably, at least one imidazole moiety is in a terminal position with respect to the structure of the molecule. Imidazole ring nitrogens frequently serve as coordinating ligand to operably bind a metal ion such as zinc or cadmium. In one embodiment, the imidazole-containing compound comprises an amino acid, or two or more amino acids joined together (e.g., known in the art as "peptidyl" or "oligopeptide"), which may include, but is not limited to, histidine, carnosine, anserine, baleine, homocarnosine, 1-methylhistidine, 3-methylhistidine, imidazolysine, imidazole-containing ornithine (e.g., 5-methylimidazolone), imidazole-containing alanine (e.g., (beta)-(2-imidazolyl)-L(alpha)alanine), carcinine, histamine, and the like Imidazole-containing amino acids may be synthesized using methods known in the art (see, e.g., Stankova et al., 1999, J. Peptide Sci. 5:392-398, the disclosure of which is herein incorporated by reference).

By the term "amino acid" is meant, as known in the art and for purposes of the specification and claims, to refer to a compound containing at least one amino group and at least one carboxyl group. As known in the art, an amino group may occur at the position adjacent to a carboxyl group, or may occur at any location along the amino acid molecule. In addition to at least one imidazole moiety, the amino acid may further comprise one or more additional reactive functionalities (e.g., amino, thiol, carboxyl, carboxamide, and the like). The amino acid may be a naturally occurring amino acid, a synthetic amino acid, a modified amino acid, an amino acid derivative, an amino acid precursor, in D (dextro) form, or in L (levo) form. Examples of derivatives may include, but is not limited to, an N-methylated derivative, amide, or ester, as known in the art, and where consistent with the functions of the amino acid as a coating as described herein (e.g., imparts water-solubility, buffers sufficiently in a pH range between about pH 6 and about pH 10, functions as a coat which can increase fluorescence intensity, and has one or more reactive functionalities that may be used to operably bind molecular probe). One or more amino acids can be used. Histidine is an exemplary imidazole-containing compound for coating the functionalized, fluorescent nanocrystals described herein.

Ligands and coatings on the nanocrystals provided herein also can be cross-linked to increase the stability of the nanocrystal composition and improve its characteristics. The surface coating of ligands on nanocrystals can be cross-linked using methods and cross-linking agents described by Naasani. Exemplary cross-linking agents include those described by Naasani, et al., including tris(hydroxymethyl) phosphine (THP) and tris(hydroxymethyl)phosphino-propionate (THPP). Also provided herein are nanocrystals having water-solubilizing ligand coatings that are cross-linked.

In certain embodiments, the semiconductor nanocrystals provided herein can be a component in a composition. For example, compositions are provided in which the semiconductor nanocrystals are embedded in or applied to the surface of a solid or semi-solid matrix (e.g., polymer matrix, bead, or resin). Alternatively, the composition can be in the form of a liquid, gel, paste, cream, patch, film, or a powder (e.g., lyophilized powder). Certain compositions are provided that include one or more semiconductor nanocrystals that emit light in a wavelength range that is substantially non-absorbent to animal fluid, cells, or tissue; are adapted for inserting into a mammalian body; or are formulated for use in an in vitro biological assay or an in vivo assay. Also provided are pharmaceutical compositions (e.g., non-toxic compositions that are suitable for pharmaceutical use) that include at least one semiconductor nanocrystal, as described herein. Compositions can be formulated for various pharmaceutical uses, including for ophthalmic and topical administration. The pharmaceutical composition can further include a pharmaceutically acceptable carrier for the nanocrystals (e.g., water, a saline solution, or a buffer). Alternatively, the composition can be in the form of a liquid, gel, paste, cream, patch, film, or a powder (e.g., lyophilized powder).

In yet another aspect, kits containing ZnTe nanocrystals are provided. The kits can be for pharmaceutical use or for use in a biological assay. An exemplary kit for pharmaceutical use includes a) one or more pharmaceutically acceptable containers; b) a pharmaceutical composition as provided herein; and c) instructions for use. Kits for biological assay can include, in addition to the nanocrystals, other reagents, such as solvents, standards, buffers, dyes, and the like.

Methods of Using the ZnTe Nanocrystals

ZnTe nanocrystals can be used in methods for tracking molecules that are known in the art. For example, they can be linked to various target molecules by known methods. Commonly, they are linked to an affinity molecule or used in further transformations. Such further transformations can be used to introduce onto the surface of a nanocrystal a selected target (or cargo) molecule of interest, such as an antibody or other specific affinity molecule. Methods for attaching such affinity molecules to a fluorescent carrier are known in the art and can readily be adapted for use in the present methods: see, e.g., U.S. Pat. No. 6,423,551, which also describes some bi-functional agents that can be used to link the surface of a nanocrystal to a target molecule and to a nanocrystal surface. These methods can also be used to introduce a number of, or a layer of, functionalized molecules on the surface of a nanocrystal, where the functionalized molecules can provide new surface properties to the nanoparticle, such as water-dispersability. In some embodiments, nanocrystals modified for attachment of an affinity molecule are provided that can be used to detect a desired target compound, cell or cellular organelle.

The modified nanocrystals can be linked to an affinity molecule for use in methods to track, identify, or localize molecules of interest that the affinity molecule can bind to, demonstrating that the molecule of interest is present and where it is distributed or localized. The nanocrystals can also be used in binding experiments to visualize distribution of molecules that the affinity molecule recognizes. Selection of a suitable affinity molecule is within the ordinary level of skill in the art once a target compound is identified. For example, conventional methods can be used to produce or identify an antibody suitable to specifically bind to a target molecule of interest. The antibody can thus be linked to the nanocrystal, which can then be used to identify the presence, location, or movements of the target compound, using the nanocrystal as a fluorescent label. In some embodiments, methods are provided to identify or track a target molecule, by linking a suitable affinity molecule that selectively binds to the target molecule to a nanocrystal, and permitting the nanocrystal linked to the affinity molecule to contact the target molecule. Tracking or detection can be achieved by using conventional methods for tracking a fluorescent labeled moiety, such as by use of a fluorescence imaging system, microscope or camera.

In some embodiments, a functionalized nanocrystal is provided. The nanocrystal can be linked to an affinity molecule selected to bind specifically to a target molecule of interest. Optionally, the nanocrystal linked to the affinity molecule can be bound to the target molecule of interest to form a fluorescently labeled complex. Target molecules of interest include proteins, enzymes, receptors, nucleic acids, hormones, and cell surface antigens characteristic of specific types of cells.

The ZnTe nanocrystals provided herein can be used in numerous applications, such as flow cytometry, cellular imaging (including live cell imaging and tracking of stem cells), and protein blotting. In particular, these nanocrystals are particularly useful in certain in vivo applications that involve visualizing a labeled molecule and where toxicity concerns need to be minimized. For example, ZnTe nanocrystals can be used in tracking stem cells, as surgical markers, and in sentinel lymph node mapping. ZnTe nanocrystals are sufficiently non-toxic to allow their use in industrial applications where environmental disposal is particularly problematic, such as lighting and display technology, and in other high volume consumer applications, such as electronics.

Certain nanocrystal compositions are particularly useful for imaging in medical applications (e.g., screening assays or surgical procedures) that require non-toxic materials which can be visualized in the presence of body tissue and fluids. Certain ZnTe nanocrystal compositions provided herein are particularly appropriate for use in medical imaging. For example, ZnTe nanocrystals that emit in the green region of the electromagnetic spectrum (e.g., about 510-550 nm) are particularly useful in ophthalmic applications. Since eye tissues are transparent to this portion of the electromagnetic spectrum, green ZnTe nanocrystals can be used for visualizing the blood vessels of the eye and for evaluating certain eye diseases that can affect the retina. The ZnTe nanocrystals provide an alternative to traditional fluorescein angiography and provide further additional advantages. Since ZnTe nanocrystals are far brighter than organic dyes such as fluorescein, they can be used in minute quantities and can facilitate imaging of single cell events (e.g., retinal cell death), which is not feasible with existing dye-based angiography procedures. In addition, standard instrumentation for performing fluorescein angiograms can be used to detect the ZnTe nanocrystals without modification.

A representative nanocrystal-based assay for ophthalmic screening involves injecting a pharmaceutically acceptable ZnTe nanocrystal composition (e.g., in the form of a saline solution), into a vein in the arm or a patient. The nanocrystals travel to the blood vessels inside the eye. Once within the blood vessels of the eye, the nanocrystals can be imaged using a camera equipped with appropriate filters as they circulate through the vessels in the back of the eye. The images of the nanocrystals can be used to assess whether there are any circulation problems, swelling, leaking, or abnormality of the blood vessels.

Certain ZnTe nanocrystal materials provided herein can be used in surgical procedure, such as, for example, as surgical markers. In one representative method, tissue can be marked prior to a surgical procedure. Certain portions of the tissue at the surgical site can be treated with a pharmaceutically acceptable ZnTe-containing composition. The composition can be formulated in various ways and is typically formulated for direct topical application (e.g., as a gel, paste, film, spray, powder, and the like). Once treated, the marked tissue can be visualized using methods well known to those in the art. In one exemplary method, a nanocrystal composition is applied to the tumor tissue to mark the tumor tissue that is to be removed during a tumor resection surgery. The marked tissue is visualized prior to and after tumor resection. Any tumor tissue remaining after excision (e.g., at the resection margin) can be readily visualized using known methods.

The non-toxic ZnTe nanocrystals provided herein also are suitable for use in industrial and consumer applications, especially where manufacturing or disposal of large quantities of nanocrystals (e.g., CdSe) is of concern. The described nanocrystals can be used, for example, in electronic and photovoltaic devices, such as displays, light emitting diodes (LED's), sensors, and solar panels. Certain devices may require that the semiconductor nanocrystals be embedded in or applied to the surface of a solid or semi-solid matrix (e.g., polymer matrix, bead, or resin).

Other uses, adaptations and variations of the invention will be apparent to those skilled in the art from the foregoing description. The following examples are provided as further guidance regarding the making and using of the methods of the invention, and are not to be construed as limiting the scope of the invention.

EXAMPLES

Example 1

Preparation of Znte Core Nanocrystals

This example describes an exemplary method for making ZnTe nanocrystals of the invention. Dioctylamine is rigorously dried as described herein, and is used as the solvent for ZnTe nanocrystal core formation Zinc oleate is added, followed by tellurium in TOP, which is referred to as TOPTe. This is heated at about 290° C. with a very small amount of lithium triethylborohydride, sufficient to provide a desired amount of nucleation. Heating is continued until the absorbance maximum for the ZnTe nanocrystals reached the desired wavelength (color), e.g., about 425 nm to about 540 nm. The cores can be isolated by conventional methods.

Example 2

Addition of ZnSe Shell to ZnTe Cores

The ZnTe cores are treated as follows to grow a ZnSe shell on the core. ZnTe cores are dispersed in dioctylamine, which has been rigorously dried as described herein. Zn(oleate)Cl (0.3 equiv.) is added, and the mixture is heated to about 300° C. TOPSe and Zn(oleate)Cl (about 1 equivalent) is then added, and heating is continued until the desired fluorescent wavelength is reached, indicating that the nanocrystals have reached a desired size. Nanocrystals having a fluorescence maximum between about 525 nm and about 560 nm can be produced, depending upon the size of the ZnTe core and the thickness of the ZnSe shell. The core/shell nanocrystals are isolated by conventional methods.

Example 3

Addition of ZnS Shell to ZnTe/ZnSe Core/Shells

ZnTe cores with a ZnSe shell were dispersed in dried dioctylamine. Zn(oleate)Cl (0.3 equiv) was added and the mixture was heated to about 250° C. Zn(oleate)Cl and sulfur-oleylamine (about 1 equivalent) were added gradually over the course of 1-3 hours until a desired shell thickness has been added. The mixture was cooled and the nanocrystals were isolated by conventional methods.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A semiconductor nanocrystal, comprising:
   a semiconductor core comprising zinc and tellurium;
   a semiconductor shell surrounding the core comprising zinc and selenium; and
   a hydrophilic surface coating on the shell that renders the nanocrystal water dispersible.

2. The semiconductor nanocrystal of claim 1, wherein the nanocrystal has a quantum yield of at least 20%.

3. The semiconductor nanocrystal of claim 1, further comprising an additional shell, which is a shell of ZnS applied over the ZnSe shell.

4. The semiconductor nanocrystal of claim 1, wherein the semiconductor core consists essentially of zinc and tellurium.

5. The semiconductor nanocrystal of claim 1, wherein the shell consists essentially of zinc and selenium.

6. A water-stable semiconductor nanocrystal composition, comprising the semiconductor nanocrystal of claim 1, wherein the surface coating is a water-stabilizing layer.

7. A population of semiconductor nanocrystals, the population comprising a plurality of semiconductor nanocrystals of according to claim 1, and having a quantum yield of at least 20%.

8. A composition, comprising the population of semiconductor nanocrystals of claim 7, wherein the composition is photochemically and chemically stable and non-toxic to cells or tissue.

9. The composition of claim 8, further comprising an organic solvent, water, polymer, or glass.

10. The composition of claim 8 formulated for use in an in vitro biological assay, an in vivo assay, or for ophthalmic or topical administration.

11. A kit, comprising:
   a) the composition of claim 8; and
   b) instructions for use.

12. A population of ZnTe semiconductor nanocrystals produced by a method comprising contacting a $Zn^{2+}$ salt with a $Te^0$ precursor in a solvent at a temperature that is sufficiently high to induce nanocrystal formation, wherein each nanocrystal further comprises a hydrophilic surface coating on the shell that renders the nanocrystal water dispersible.

13. The population of claim 12, wherein the method further comprises adding an amount of a strong reducing agent to the solvent to initiate nanocrystal formation.

14. The population of claim 12, wherein the method further comprises contacting the semiconductor ZnTe core in a solvent with a $Zn^{2+}$ salt and a $Se^0$ precursor, at a temperature sufficiently high to induce formation of a ZnSe shell on the ZnTe nanocrystal core.

15. A method to form the semiconductor nanocrystal of claim 1, comprising contacting a semiconductor ZnTe core in a solvent with a $Zn^{2+}$ salt and a $Se^0$ precursor , at a temperature sufficiently high to induce formation of a ZnSe shell on the ZnTe nanocrystal core.

16. The method of claim 15, wherein the $Se^0$ precursor is added after the $Zn^{2+}$ salt.

17. The method of claim 15, wherein the $Zn^{2+}$ salt is $ZnCl_2$, $ZnCl(O_2CR)$ or $Zn(O_2CR)_2$, wherein R is an alkyl group, or comprises an alkyl carboxylate anion or an oleate.

18. The method of claim 17, wherein the alkyl carboxylate anion comprises 4-24 carbon atoms or at least one unsaturated group.

19. The method of claim 15, wherein the alkyl group comprises at least one unsaturated group.

20. The method of claim 15, further comprising applying an outer shell of ZnS over the ZnTe/ZnSe core/shell nanocrystal.

21. A method of detecting a target in a biological sample, the method comprising:
   contacting a biological sample with the semiconductor nanocrystal of claim 1; and
   detecting the spectral emission of the semiconductor nanocrystal.

22. A population of ZnTe/ZnSe semiconductor nanocrystals produced by the method of claim 15.

* * * * *

UNITED STATES PATENT AND TRADEMARK OFFICE
CERTIFICATE OF CORRECTION

| | | |
|---|---|---|
| PATENT NO. | : 8,637,082 B2 | Page 1 of 1 |
| APPLICATION NO. | : 13/119170 | |
| DATED | : January 28, 2014 | |
| INVENTOR(S) | : Tulsky et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 81 days.

Signed and Sealed this
Twenty-first Day of July, 2015

Michelle K. Lee
*Director of the United States Patent and Trademark Office*